(No Model)
W. H. KNIGHT.
AIR COMPRESSOR.
No. 586,100. Patented July 13, 1897.
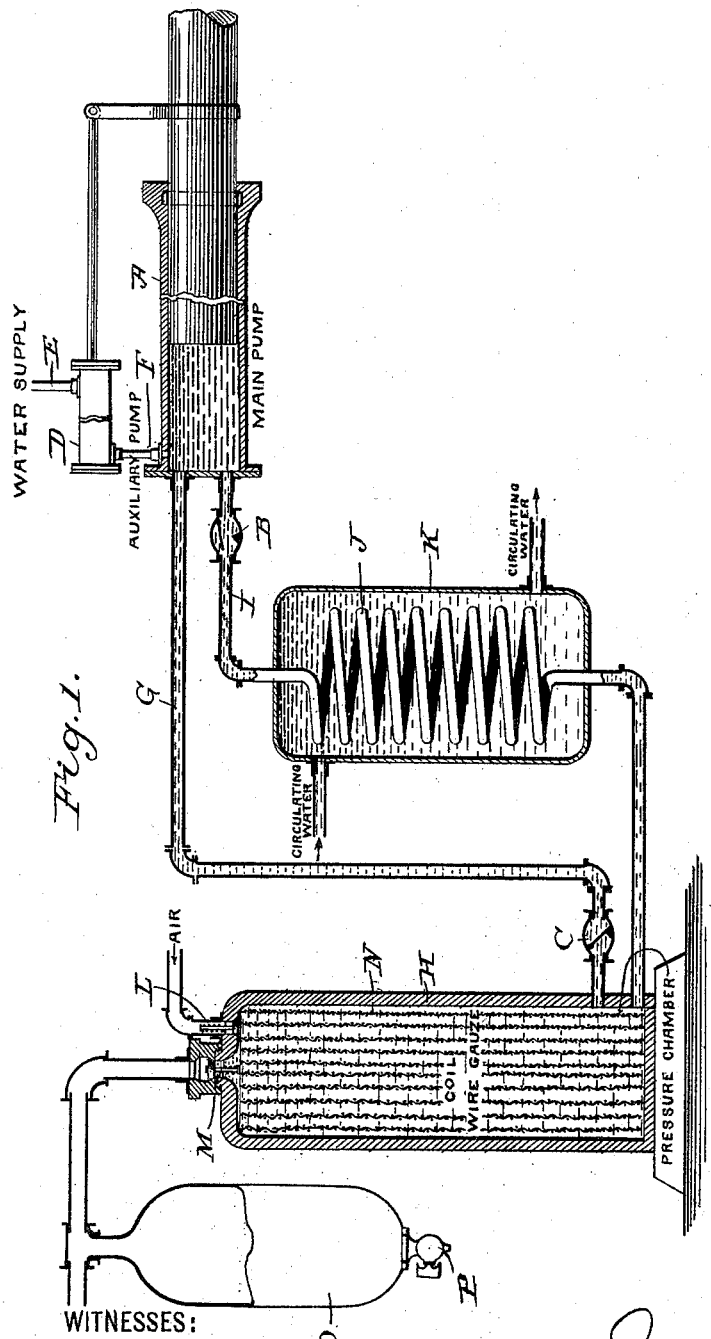
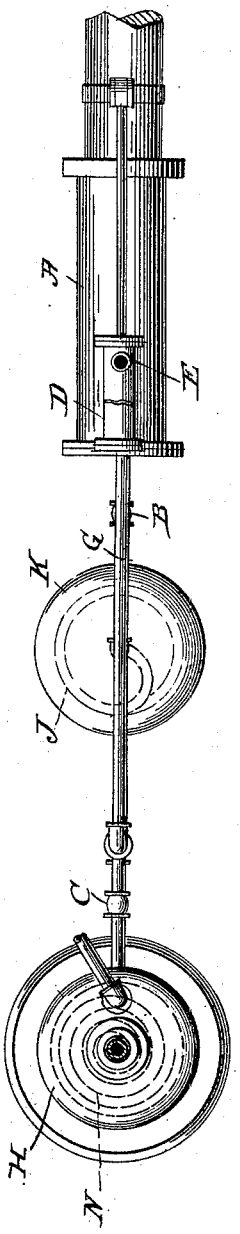
WITNESSES:
INVENTOR
Walter H. Knight
BY
Knight Bros
ATTORNEYS

UNITED STATES PATENT OFFICE.

WALTER H. KNIGHT, OF NEW BRIGHTON, NEW YORK.

AIR-COMPRESSOR.

SPECIFICATION forming part of Letters Patent No. 586,100, dated July 13, 1897.

Application filed May 7, 1896. Serial No. 590,613. (No model.)

*To all whom it may concern:*

Be it known that I, WALTER H. KNIGHT, a citizen of the United States, residing at New Brighton, in the county of Richmond and State of New York, have invented certain new and useful Improvements in Air-Compressors, of which the following is a specification.

My invention relates to improvements in air-compressors.

The object of my invention is to condense air to high pressures while avoiding the attendant disadvantages of heating and leakage.

In the accompanying drawings, which form a part of this specification, Figure 1 is a diagrammatic elevation of my device. Fig. 2 is a plan thereof.

By reference to the drawings it will be seen that my invention consists of a main pump or hydraulic cylinder A, with its usual valves B C, an auxiliary pump D, having a water-supply pipe E leading thereto and delivery water-pipe F to the hydraulic cylinder or into any part of the pipes leading therefrom. Of the pipes from the main pump one, G, leads directly to a pressure-chamber or air-cylinder H, while the other, I, on its way thereto passes in a coil J through a cooling-chamber K, kept supplied with a refrigerating liquid. The pressure-chamber has an inlet-valve L for air and an outlet-valve M to the compressed-air pipe. The pressure-chamber is, moreover, filled with copper or other good conductor of heat in a finely-divided state, such as coils of wire-gauze N, wires, tubes, or turnings. Interposed between the pressure-chamber and the compressed-air storage tank or reservoir is a drip-cylinder O, which is provided with a cock P for drawing off the water as it accumulates.

The whole system is, before use and while the pump-plungers are at the bottom of their strokes, filled with liquid.

The operation of my invention is as follows: Upon withdrawing the pump-plungers water flows from the pressure-chamber into the main pump, while air to take its place enters said chamber through the air-valve. The auxiliary pump draws in a small quantity of water by means of its supply-pipe. Upon the return of the pump-plungers the water is driven from the pumps into the cooling-coil, while the water which was contained in said coil enters the pressure-chamber, compressing the air above it as its level rises and driving it out by way of the air-pipe.

As the auxiliary pump has added its volume of water to that contained in the system the total supply is greater than before, so that the water continues to rise in the pressure-chamber until all the air has been expelled and with it an amount of water equal to the volume of the small pump. By this means clearance is entirely avoided, as all the air is discharged from the system.

Upon the descent of the water in the pressure-chamber the wire-gauze is left cool and wet, so that the heat developed by compressing the next charge of air is taken up by the wet metal, which is in turn again cooled by the incoming water. The size of the cooling-coil and pump are so adjusted to each other that the same water may remain in the coil during one or more strokes of the pump in order to have its temperature sufficiently reduced. This cycle is indefinitely repeated.

The small amount of water which leaves the system with the air is trapped on its way through the air-pipe and removed.

In all air-compressors employing liquid pistons used prior to my invention the liquid piston has been moved to and fro into and out of the air-compressing chamber continuously, the same liquid entering the compression-chamber at each stroke of the machine.

My invention differs broadly from all prior machines in that the compressing-liquid piston is caused to circulate by intermittent stages from the hydraulic cylinder of the pump through the liquid-cooler into the air-compression chamber and back through a suitable pipe into the hydraulic cylinder. This circulation of the liquid forming the liquid piston is very important in that the temperature of the liquid can readily be kept to the desired low degree.

Having thus described my invention, what I claim as new, and desire to secure by Letters Patent, is—

1. In an air-compressor, the combination of an air-compressing chamber or cylinder, a hydraulic pump communicating with said air-compressing chamber or cylinder, suitable air-valves to the air-compressing chamber, and means for causing the liquid to circulate through the hydraulic pump and air-compressing chamber in contradistinction to moving to and fro into and out of the air-compressing chamber, substantially as set forth.

2. In an air-compressor, the combination of an air-compressing chamber or cylinder, a hydraulic pump or cylinder, two pipes or passages communicating between the hydraulic pump or cylinder and the air-compressing cylinder, suitable check-valves in said pipes to cause the fluid to always move in the same direction through said pipes and thereby circulate through the hydraulic pump, air-compressing cylinder and said pipes, and suitable inlet and outlet valves to the air-compressing cylinder, substantially as set forth.

3. In an air-compressor, the combination of an air-compressing chamber or cylinder, a hydraulic pump or cylinder communicating with the air-compressing cylinder through two pipes or passages, check-valves in said pipes or passages, means for cooling the liquid passing through one of said pipes or passages between the pump and air-compressing cylinder, and inlet and outlet valves to the air-compressing cylinder, substantially as set forth.

4. In an air-compressor, the combination of an air-compressing chamber or cylinder, a hydraulic pump or cylinder communicating with said air-compressing cylinder through two passages for forcing water into and withdrawing it from said chamber, a porous filling material within the air-compressing chamber for abstracting heat from the air and communicating the same to the water, means for cooling the water in its passage from the hydraulic pump to the air-compressing chamber, and suitable air inlet and outlet valves to the air-compressing chamber, substantially as set forth.

WALTER H. KNIGHT.

Witnesses:
J. GREEN,
M. V. BIDGOOD.